(12) United States Patent
Hungerford et al.

(10) Patent No.: US 6,496,329 B2
(45) Date of Patent: Dec. 17, 2002

(54) HIGHLY ALIGNED THIN FILM TAPE HEAD

(75) Inventors: Geoffrey A. Hungerford, Lafayette, CO (US); Robert B. Chesnutt, Anada, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/997,151

(22) Filed: Nov. 29, 2001

(65) Prior Publication Data
US 2002/0034042 A1 Mar. 21, 2002

Related U.S. Application Data

(63) Continuation of application No. 09/275,564, filed on Mar. 24, 1999, now Pat. No. 6,362,934.

(51) Int. Cl.[7] .............................................. G11B 5/265
(52) U.S. Cl. ....................................................... 360/121
(58) Field of Search ............................... 360/121, 119, 360/122, 128, 129

(56) References Cited

U.S. PATENT DOCUMENTS

| | | |
|---|---|---|
| 3,514,851 A | 6/1970 | Perkins et al. |
| 4,017,965 A | 4/1977 | Brutsch et al. |
| 5,116,719 A | 5/1992 | Gau |
| 5,141,623 A | 8/1992 | Cohen et al. |
| 5,142,768 A | 9/1992 | Aboaf et al. |
| 5,208,714 A | 5/1993 | Denison et al. |
| 5,264,981 A | 11/1993 | Campbell et al. |
| 5,307,217 A | 4/1994 | Saliba |
| 5,402,295 A | 3/1995 | Suzuki et al. |
| 5,804,085 A | 9/1998 | Wu et al. |
| 5,844,749 A | 12/1998 | Sakai et al. |
| 6,055,137 A | 4/2000 | Ishiwata et al. |
| 6,097,570 A | 8/2000 | Dee |

FOREIGN PATENT DOCUMENTS

| | | |
|---|---|---|
| EP | 0452 846 A2 | 10/1991 |
| JP | 100 55506 | 2/1998 |
| WO | WO 97/05603 | 2/1997 |
| WO | WO 98/39770 | 9/1998 |

OTHER PUBLICATIONS

McDermott, Michael, Head Makers Discover Focused Ion Beams, Reprinted from Mar. 1998 edition of Data Storage.

Primary Examiner—David L. Ometz
(74) Attorney, Agent, or Firm—Brooks & Kushman P.C.

(57) ABSTRACT

Reducing alignment errors between a read element and corresponding write elements permits narrower data tracks and, hence, greater data density on magnetic tape. A method for manufacturing a thin film tape head having multiple write elements and at least one read element corresponding to each write element is provided. Excess material is trimmed from each write element to align the write element with corresponding read elements. The excess material may be track trimmed using a focused ion beam.

15 Claims, 5 Drawing Sheets

HIGHLY ALIGNED THIN FILM TAPE HEAD

CROSS-REFERENCE TO RELATED APPLICATIONS

This application is a continuation of U.S. application Ser. No. 09/275,564 filed Mar. 24, 1999, now U.S. Pat. No. 6,362,934 which is incorporated herein in its entirety.

TECHNICAL FIELD

The present invention relates to thin film magnetic tape recording heads for accessing magnetic tape possessing a high degree of alignment between read elements and write elements accessing a particular data track.

BACKGROUND ART

Reliability, cost-efficiency, and ease of use make magnetic tape the medium of choice for many information storage and retrieval applications. Typically, multiple data tracks are written simultaneously by write elements in a tape head. Similarly, multiple read elements are used to simultaneously sense multiple data tracks. The desire to increase information density held by magnetic tape has resulted in narrower and more closely spaced data tracks. This results in the need for close alignment between head elements which access each data track. This is particularly true for read-after-write operations in which data is read immediately following the write operation to verify the correctness of recorded data.

A tape head generally contains multiple write elements to simultaneously write multiple tracks for achieving a high rate of data transfer. Multiple read elements are used to achieve the same rate of data transfer during play back operations. The tape head is constructed using thin film techniques to permit the small element geometry required for high information density recording and to reduce the cost of production by applying replication and manufacturing techniques similar to those used in integrated circuit production. Many tape head designs are possible. One design consists of separate read modules and write modules. Each write module includes multiple write elements spaced across the tape surface. Similarly, each read module consists of multiple read elements spaced across the tape surface. The tape head is constructed by attaching read and write modules. A typical construction has one write module sandwiched between two read modules to permit read-after-write operation in either tape direction. Tape heads of this design are described in U.S. patent applications Ser. No. 08/939,773 titled "Magnetic Tape Head Assembly" filed Sep. 29, 1997 by R. Dee et al. and Ser. No. 08/975,645 titled "Magnetic Tape Head Assembly Having Segmented Heads" filed Nov. 21, 1997 by R. Dee et al., both of which are incorporated by reference herein. Another design has pairs of read elements and write elements constructed in the same module. At least two modules are joined together to permit read-after-write tape operation in either direction. Designs of this type are described in U.S. Pat. No. 5,264,981 titled "Multilayered Ferromagnetic Film And Magnetic Head Employing Same," U.S. Pat. No. 5,208,714 titled "Magnetic Hybrid Interleaved Head With Closure Supporting Islands," and U.S. Pat. No. 5,142,768 titled "Method For Making Magnetic Head With Enhanced Poletip," each of which are incorporated by reference herein.

In designs having read and write elements in the same module, alignment errors between paired read and write elements may be compensated by changing the azimuth angle. The azimuth angle is defined as the angle between a line running along the center of the data track and a line through the center of corresponding read and write elements. One problem with this technique in multiple module tape heads is that changing the azimuth angle to improve element alignment within one module may worsen element alignment in another module. Another difficulty is that increasing the azimuth angle introduces a skew distance in the tape direction between write elements and between read elements. The skew distance causes the same point along the length of a data track in each data track across the width of the tape to cross write elements or read elements at a different time. This skew time requires the introduction of skew buffers to ensure proper writing and reading of data. Skew compensation buffers are expensive and require complicated logic.

Alignment problems may be even greater in tape heads constructed with separate read and write modules. Since it is unlikely that a line can be drawn through the center of all elements accessing a given data track, changing the azimuth angle will not correct for alignment problems in tape heads having separate read and write modules.

What is needed is a system and method for highly aligned elements within a magnetic tape head. The tape head should be economical to produce and should be constructed by readily available manufacturing processes.

DISCLOSURE OF INVENTION

It is an object of the present invention to provide for improved tape head element alignment.

Another object of the present invention is to provide for decreased skew distances in read-write modules.

Still another object of the present invention is to provide for decreased element alignment errors in multiple module tape heads.

Yet another object of the present invention is to provide a tape head having closely aligned read and write elements that are constructed using readily available manufacturing processes.

A further object of the present invention is to provide a tape head having closely aligned read and write elements that is economical to produce.

In carrying out the above objects and other objects and features of the present invention, a method for manufacturing a thin film tape head having multiple write elements and at least one read element corresponding to each write element is provided. Alignment is achieved by trimming excess material from each write element to align the write element with the at least one corresponding read element. This trimming may be accomplished using a focused ion beam.

A thin film read-write-read tape head is provided. The tape head includes a write module having write elements. Each write element has a top pole and a bottom pole for writing a data track, the data track width defined by the lengths of the top pole and the bottom pole. The tape head also includes one read module on either side of the write module. Each read module has a read element corresponding to each write element for reading the data track. The poles are trimmed to remove excess pole material outside of a desired data track width centered across a line between corresponding read elements in each read module.

A method for manufacturing a thin film tape head includes constructing at least one write module having multiple write elements. Each write element includes top and bottom poles constructed with excess material in a direction defining data track width. The write module is assembled between two read modules. Each read module has a read element corresponding to each write element. Excess material to be removed from the top pole and the bottom pole of each write element is determined such that material remaining forms a write element having a desired track width aligned between the corresponding read elements. The excess material is then trimmed from the top pole and the bottom pole of each write element.

In an embodiment of the present invention, determining the excess material to remove includes measuring the location of the center for each of the two read elements corresponding to a write element. An azimuth line from the first read element center through the second read element center is determined. The intersection of the write element center along the azimuth line is determined. The excess material is that portion of the top pole and the bottom pole outside of a region defining a desired data track width centered on the intersection. The tape head may then be mounted such that the azimuth line is parallel with either tape direction.

A thin film read-write module is also provided. The read-write module includes write elements aligned along a gap line. Each write element has top and bottom poles for writing a data track. The data track width is defined by pole lengths. The module also includes a read element corresponding to each write element for reading the data track. The top and bottom pole lengths are trimmed to remove excess pole material outside of a desired data track width centered across a line through the corresponding read element center and normal to the gap line.

A method of manufacturing a read-write module is provided. The read-write module includes write elements aligned along a gap line and a read module corresponding to each write element. The center of a read element is located. An azimuth line normal to the gap line and through the center of the read element is determined. Excess material from the write element top and bottom poles is trimmed such that a desired data track width is centered on the azimuth line.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
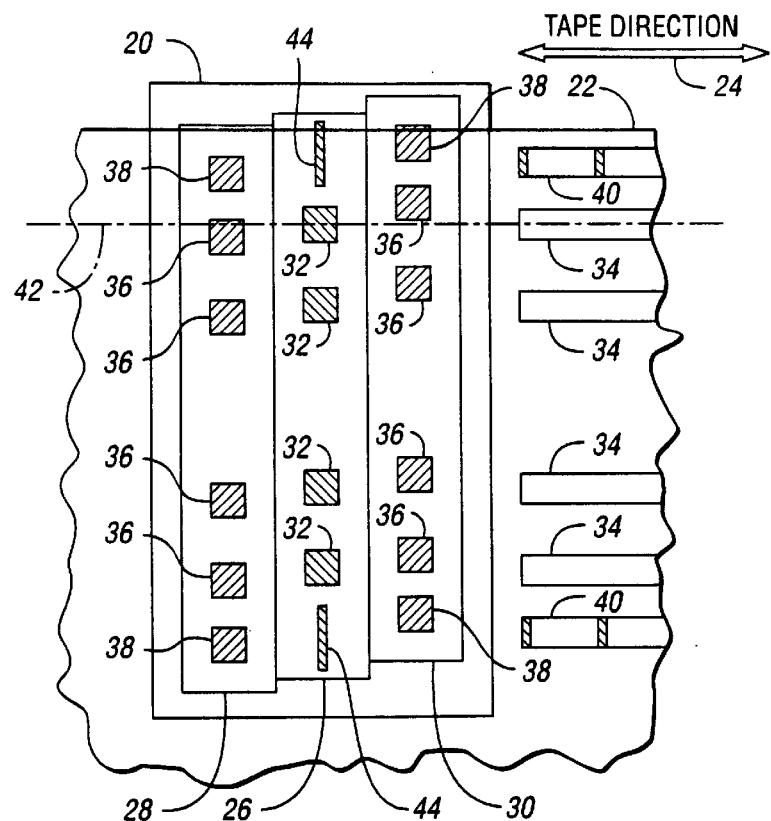
FIG. 1 is a conceptualized drawing of a prior art read-write-read tape head.

Referring now to FIG. 1, a conceptualized drawing of a prior art read-write-read tape head is shown. Tape head 20 accesses magnetic tape 22 passing by tape head 20 in tape direction 24. Tape head 20 includes write module 26 sandwiched between first read module 28 and second read module 30. Write module 26 includes multiple write elements 32, each operative to write data track 34 on magnetic tape 22. Each read module 28,30 includes one read element 36 corresponding to each write element 32 in write module 26. Each read element 36 can read data from data track 34 on magnetic tape 22.

Typically, at least one read module 28,30 includes servo read elements 38 for reading servo tracks 40 recorded on magnetic tape 22. Patterns recorded on servo track 40 permit tape head 20 to be moved in a direction substantially normal to tape direction 24 to position elements 32,36 over data track 34. For example, data track 34 may be positioned so that data track center 42 is centered over write element 32 during a write operation.

Write module 26 may include fiducial marks 44 aligned with write elements 32. Fiducial marks 44 permit tape head 20 to be mounted such that the alignment of write elements 32 is normal to the path of magnetic tape 22 moving by tape head 20.

Modules 26,28,30 are manufactured using thin film techniques that permit the spacing between elements 32,36 within a module to be accurately maintained. Modules 26,28,30 are then bonded together to form tape head 20. This bonding process is not as accurate as thin film manufacturing, resulting in misalignment between write element 32 and corresponding read elements 36 which access the same data track 34. This misalignment is particularly troublesome during read-after-write operations when centering write element 32 on data track 42 may result in the center of read element 36 being positioned away from data track center 42 in a direction normal to data track center 42.

Figure 2:
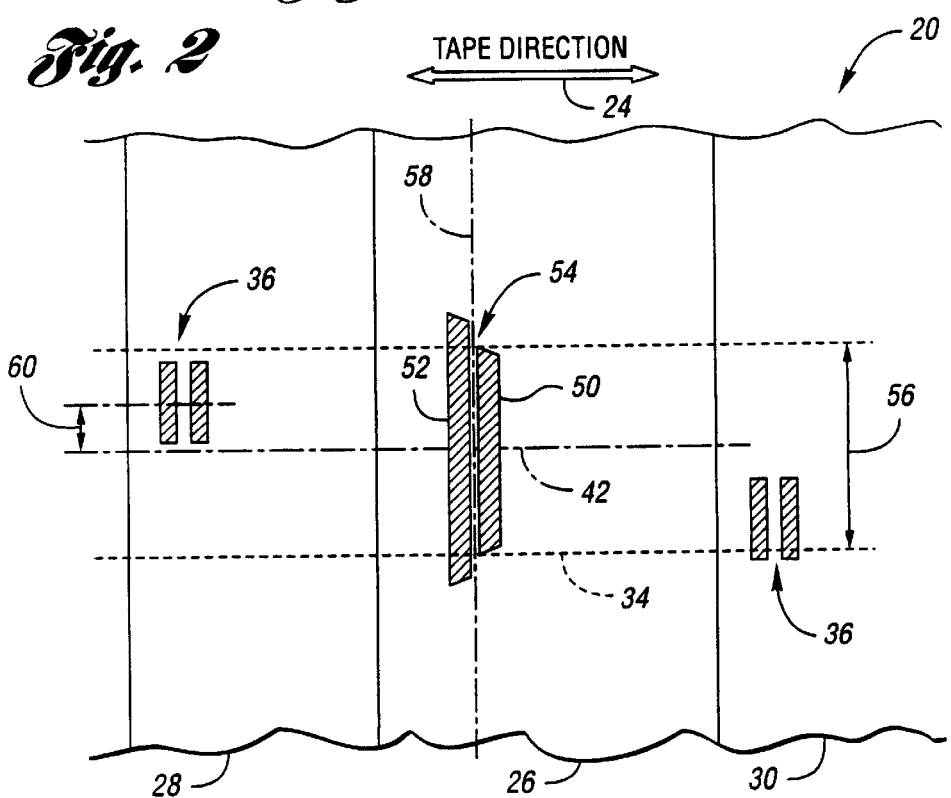
FIG. 2 is a conceptualized drawing illustrating misalignment between elements in a read-write-read tape head.

Referring now to FIG. 2, a conceptualized drawing illustrating misalignment between elements in a read-write-read tape head is shown. Write element 32 includes top pole 50 and bottom pole 52 separated by gap 54. Magnetic flux flowing in gap 54 between top pole 50 and bottom pole 52 produces field patterns on data track 34. The width of data track 34, indicated by 56, is determined by the length of poles 50,52 in a direction normal to data track center 42. Gap line 58 runs through the center of gap 54 for each write element 32 in write module 26.

Misalignment distance 60 may be defined as the distance between the center of read element 36 and data track center 42 in a direction normal to data track center 42 when data track 34 is centered over write element 32. Previous manufacturing methods produce read head 20 with misalignment distance 60 within ±4 microns within three standard deviations. This is not sufficient for higher density magnetic tape 22 which may have data track widths 56 of twenty microns or less.

Figure 3:
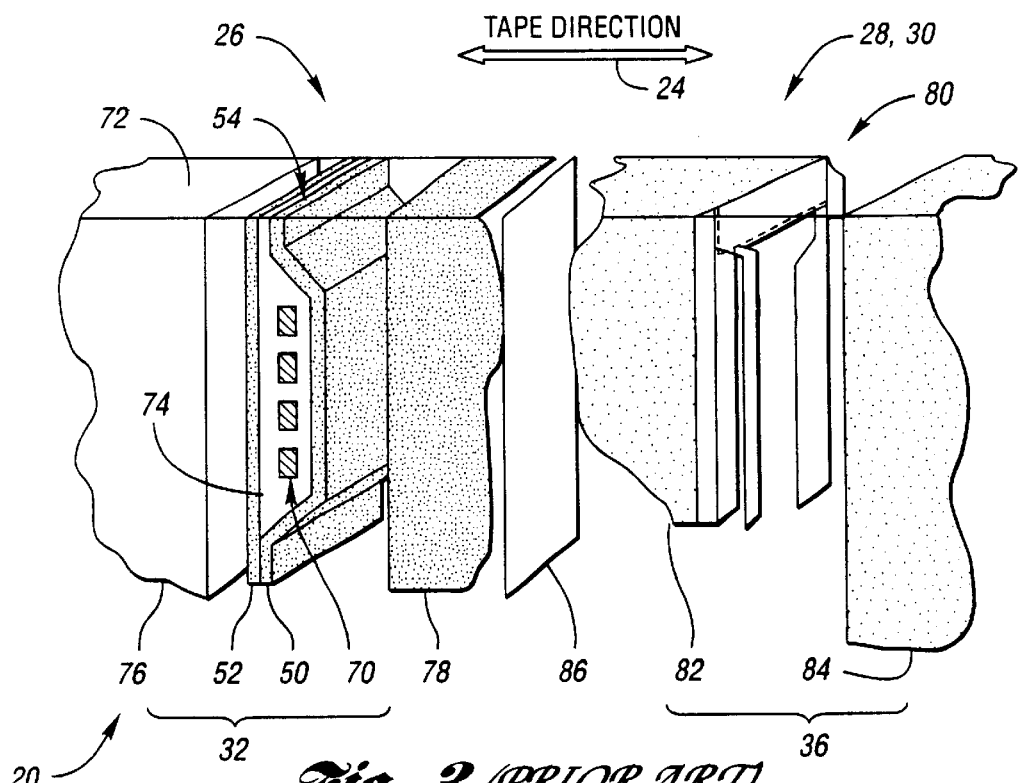
FIG. 3 is a conceptualized sectional view of a read module and a write module showing element construction.

Referring now to FIG. 3, a conceptualized sectional view of a read module and a write module illustrating element construction is shown. The proportions shown for write element 32 and read element 36 are not accurate and the spacing between elements 32,36 is much greater than actually shown.

An electromagnet is formed by bottom pole 52, top pole 50, and a conductive coil shown generally by 70, in write element 32. A current in coil 70 induces flux in poles 50,52. This flux produces a field at gap 54. As tape 22 moves across tape contact surface 72 in tape direction 24, the field produced by current in coil 70 produces magnetization fields on tape 22, not shown for clarity.

Poles 50,52 are typically constructed of a magnetically permeable alloy or amorphous mixture including at least one of elements cobalt, nickel, and iron. Coil 70 is a conductor, such as copper, that is insulated from poles 50,52 by insulation layer 74. Insulation layer 74 may be built from layers of photoresist with a layer of alumina against one of poles 50,52, the alumina extending into gap 54. Write element 32 may be built on substrate 76 and capped with cover layer 78, both of which may be constructed of an insulator with good wear properties such as AlTiC.

Read element 36 typically includes a magnetoresistive sensor, shown generally by 80, which exhibits a change in resistance due to magnetization fields on magnetic tape 22 moving over tape contact surface 72 in tape direction 24. Magnetoresistive sensor 80 is built on substrate 82 and includes cover layer 84. Substrate 82 and cover layer 84 are typically made of a magnetically permeable material, such as nickel-zinc (NiZn) ferrite, to enhance the sensitivity of magnetoresistive sensor 80.

Feed through between write element 32 and read element 36 may be reduced by including shield 86 typically constructed of a conducting material such as brass. Write module 26 and read module 28,30 constructed in this manner are typically bonded together using cyanoacrylate or an epoxy.

The previous discussion describes a typical tape head 20 for illustrative purposes and is not meant to limit the present invention to tape head 20 having only this construction. As will be recognized by one of ordinary skill in the art, a wide variety of tape heads 20 may be constructed within the spirit and scope of the present invention. For example, various other materials, geometries, and orientations may be used for write element 32. Similarly, read element 36 may be magnetoresistive, inductive, or the like.

Figure 4:
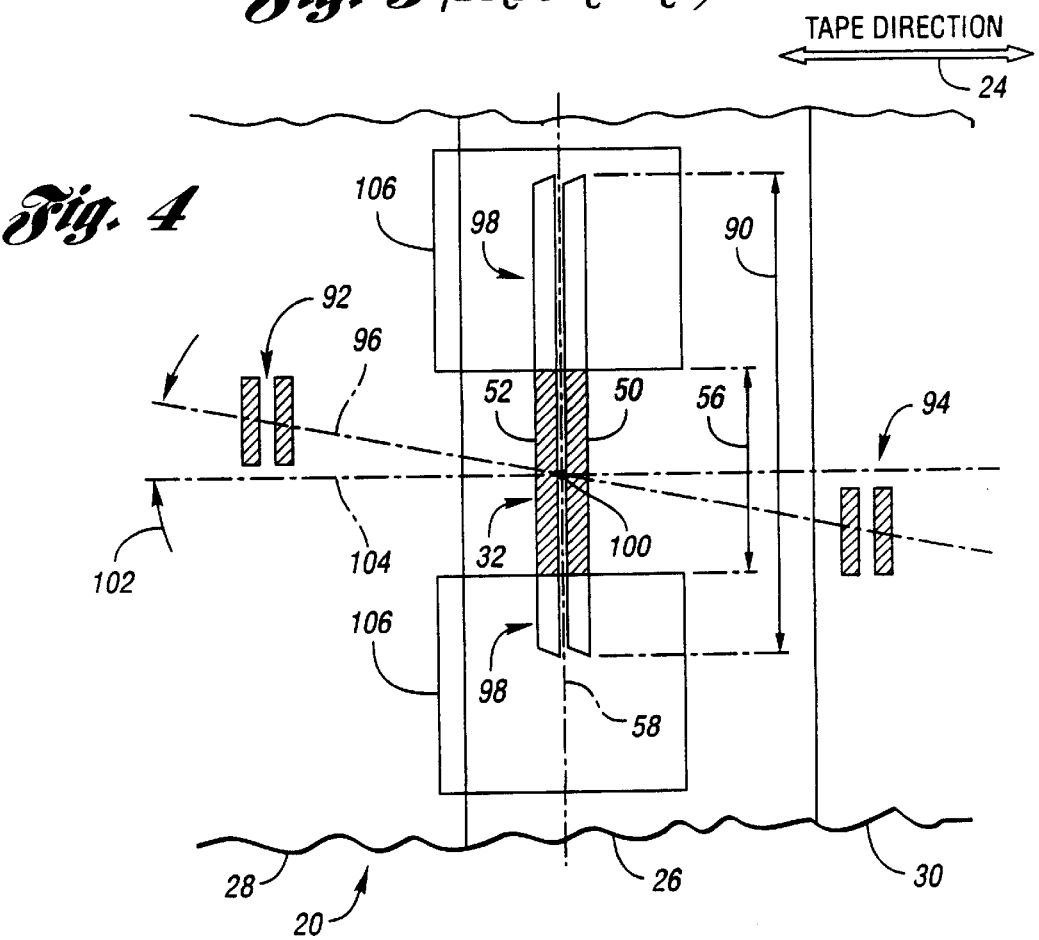
FIG. 4 is a conceptualized view of track trimming a write element in a read-write-read tape head according to an embodiment of the present invention.

Referring now to FIG. 4, a conceptualized view of track trimming a write element in a read-write-read tape head according to an embodiment of the present invention is shown. Write element 32 is constructed with top pole 50 and bottom pole 52 having excess material in a direction defining data track width 56, as indicated by pole length 90. Tape head 20 is assembled with write module 26 between first read module 28 and second read module 30. First read module 28 includes a first read element corresponding to write element 32, shown generally by 92. Second read module 30 includes a second read element corresponding to write element 32, indicated generally by 94. Material is trimmed from top pole 50 and bottom pole 52 such that desired data track width 56 is centered across azimuth line 96 extending between first corresponding read element 92 and second corresponding read element 94.

The amount of excess material to remove from top pole 50 and bottom pole 52, shown generally by 98, may be determined by first measuring the location of first corresponding read element 92 and second corresponding read element 94. This may be accomplished using a measuring microscope under computer control such as is available from Pacific Precision Laboratories of California. The measuring microscope can determine azimuth line 96 through the center of first corresponding read element 92 and second corresponding read element 94. The measuring microscope next determines the intersection of azimuth line 96 with the center of write element 32.

In an embodiment of the present invention, the intersection of azimuth line 96 and gap line 58 produces the center of write element 32. The intersection of gap line 58 with azimuth line 96 is defined to be intersection point 100.

Azimuth angle 102 is defined as the angle between azimuth line 96 and gap line normal 104. Gap line normal 104 is a line normal to gap line 58 through intersection point 100. Excess material 98 is determined to be that portion of top pole 50 and bottom pole 52 outside of a region defining track width 56 centered on the intersection of gap line 58 and azimuth line 96. Data track width 56 may extend in a direction parallel with gap line 58 as shown or may extend in a direction normal to azimuth line 96.

Excess material 98 is preferably removed by track trimming write element 32 with a focused ion beam. The focused ion beam produces etch pattern 106 removing excess material 98 from top pole 50 and bottom pole 52 to a depth of approximately one micron. The focused ion beam used operated with a 15 nanoampere beam current and a beam energy of 50 keV. The focused ion beam may be produced by a focused ion beam workstation such as is available from the FEI Company of Hillsburo, Oreg.

Figure 5:
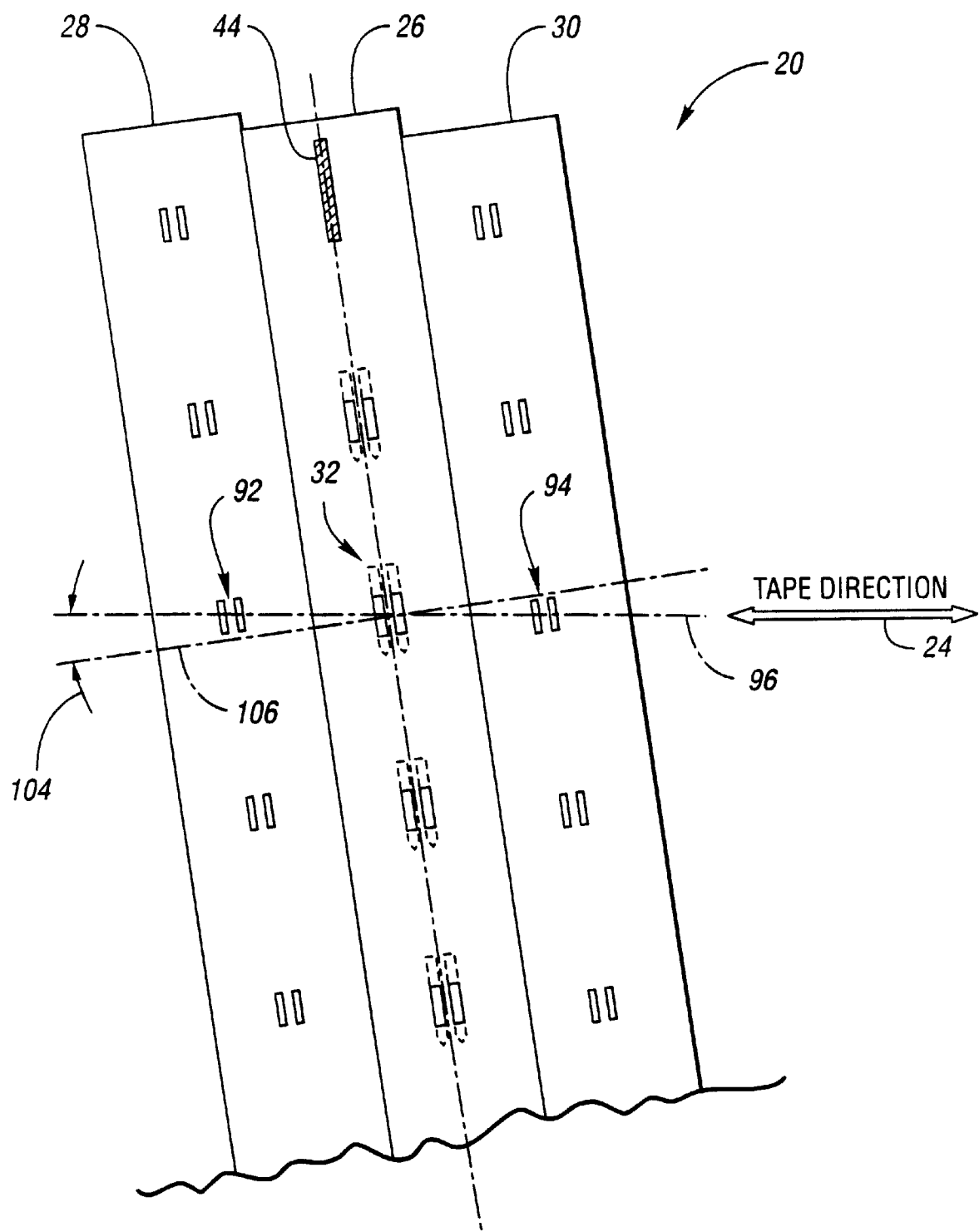
FIG. 5 is a conceptualized view of a read-write-read head according to an embodiment of the present invention.

Referring now to FIG. 5, a conceptualized view of a read-write-read head according to an embodiment of the present invention is shown. Tape head 20 is mounted so that azimuth line 96 is parallel with tape direction 24. This may be accomplished by establishing gap line 58 through two fiducial marks 44, one of which is shown in FIG. 5. Tape head 20 is then rotated such that gap line 58 forms azimuth angle 102 with a normal to tape direction 24.

Figure 6:
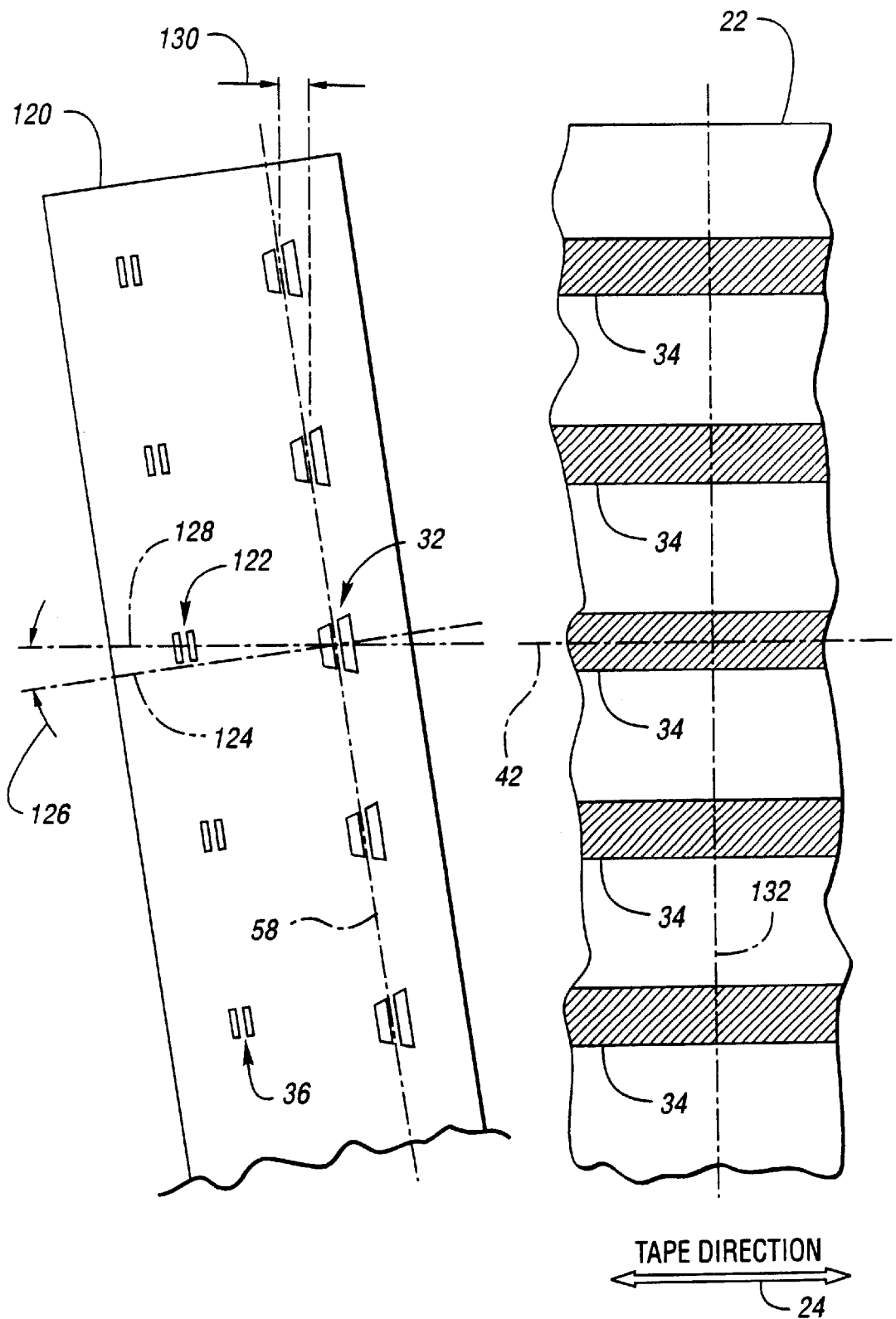
FIG. 6 is a conceptualized view of a prior art read-write module.

Referring now to FIG. 6, a conceptualized view of a prior art read-write module is shown. Read-write module 120 includes both write elements 32 and read elements 36. Due to manufacturing inaccuracies, the particular read element corresponding to write element 32, shown generally by 122, may not be centered on gap line normal 124 which is perpendicular to gap line 58 and intersects the center of write element 32. Azimuth angle 126 is defined as the angle between center line 128 running through the centers of write element 32 and corresponding read element 122 and gap line normal 124. Rotating read-write module 120 by azimuth angle 126 places center line 128 parallel with tape direction 24. This permits the centers of write element 32 and corresponding read element 122 to be aligned with data track center 42 for data track 34 on magnetic tape 22.

While this approach greatly reduces alignment errors between write element 32 and corresponding read element 122, rotating read-write module 120 introduces skew distance 130 between write elements 32 and between read elements 36. Skew distance 130 causes each write element 32 or read element 36 to cross an arbitrary line normal to track center 42 across the width of tape 22, shown generally by 132, at different times. Skew buffers are required to synchronize data written to or read from magnetic tape 22. These skew buffers add complexity and cost to a tape system including read-write module 120.

Figure 7:
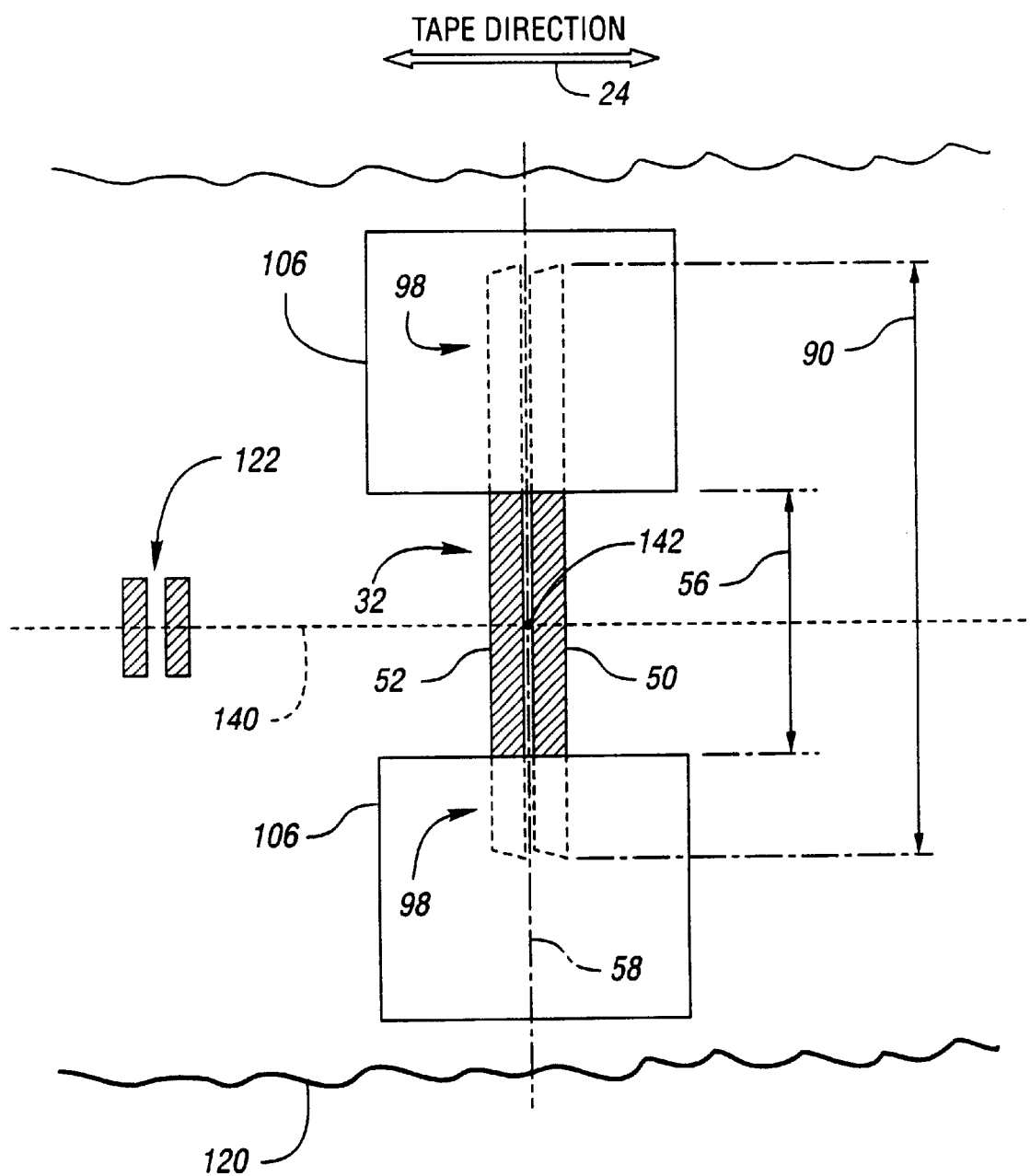
FIG. 7 is a conceptualized view of track trimming a write element in a read-write module according to an embodiment of the present invention.

Referring now to FIG. 7, a conceptualized view of track trimming a write element in a read-write module according to an embodiment of the present invention is shown. The need for skew buffers can be eliminated if write elements 32 are track trimmed so that no rotation of read-write module 120 is necessary to align the center of a write element 32 and corresponding read element 122 with data track center 42. Read-write module 120 is constructed with top pole 50 and bottom pole 52 having pole length 90 considerably longer than the desired data track width 56. Using techniques similar to those described with regards to FIG. 4 above, the center of corresponding read element 122 is located. Azimuth line 140 is found normal to gap line 58 through the center of corresponding read element 122. Intersection point 142 is found where azimuth line 140 crosses gap line 58. Excess material, indicated generally by 98, is trimmed from top pole 50 and bottom pole 52 such that the desired data track width 56 is centered on azimuth line 140 in a direction parallel to gap line 58. Excess material 98 is preferably removed from top pole 50 and bottom pole 52 with a focused ion beam forming etched patterns 106.

While embodiments of the invention have been illustrated and described, it is not intended that these embodiments illustrate and describe all possible forms of the invention. Rather, it is intended that the following claims cover all modifications and alternative designs, and all equivalence that fall within the spirit and scope of this invention.

What is claimed is:

1. A thin film read-write-read tape head for writing a plurality of data tracks onto magnetic tape comprising:

a write module including a plurality of write elements, each write element having a top pole and a bottom pole operative to write a data track, the data track width defined by at least one of a top pole length and a bottom pole length; and two read modules, one read module on either side of the write module, each read module having a read element corresponding to each write element, each corresponding read element operative to read the data track;

wherein at least one of the top pole length and the bottom pole length is trimmed to remove excess pole material outside of a desired data track width centered across an azimuth line between corresponding read elements in each read module.

2. A thin film read-write-read tape head as in claim 1 wherein the track width is formed by a focused ion beam.

3. A thin film read-write-read tape head as in claim 1 wherein the tape head is mounted with the azimuth line parallel to a tape direction that the magnetic tape travels over the tape head.

4. A thin film read-write module for writing a plurality of data tracks on a magnetic tape comprising:

a plurality of write elements aligned along a gap line, each write element having a top pole and a bottom pole operative to write a data track, at least one of a top pole length and a bottom pole length defining the data track width; and a read element corresponding to each write element, each read element operative to read the data track;

wherein at least one of the top pole length and the bottom pole length for each write element is trimmed to remove excess pole material outside of a desired data track width centered across an azimuth line through the corresponding read element center and normal to the gap line.

5. A thin film read-write module as in claim 4 wherein the top pole length and the bottom pole length are trimmed by a focused ion beam.

6. A thin film read-write module as in claim 4 wherein the module is mounted with the azimuth line parallel to a tape direction that the magnetic tape travels over the tape head.

7. A tape head for writing a plurality of data tracks onto magnetic tape, the tape head comprising a plurality of write elements and a plurality of read elements, at least one read element corresponding to each write element, wherein a length of at least one pole defining each write element is trimmed to be centered on an azimuth line extending between the write element and the at least one corresponding read element so as to align the write element with the at least one corresponding read element.

8. A tape head as in claim 7 wherein the at least one pole is trimmed by a focused ion beam.

9. A tape head as in claim 7 wherein the head is mounted with the azimuth line parallel to a tape direction that the magnetic tape travels over the tape head.

10. A thin film read-write-read tape head for writing a plurality of data tracks on to magnetic tape comprising:

a write module including a plurality of write elements, each write element having a top pole and a bottom pole operative to write a data track, the data track width defined by at least one of a top pole length and a bottom pole length; and two read modules, one read module on either side of the write module, each read module having an untrimmed read element corresponding to each write element, each corresponding read element operative to read the data track;

wherein at least one of the top pole length and the bottom pole length is trimmed to remove excess pole material outside of a desired data track width centered across an azimuth line between corresponding read elements in each read module.

11. A thin film read-write module for writing a plurality of data tracks on a magnetic tape comprising:

a plurality of write elements aligned along a gap line, each write element having a top pole and a bottom pole operative to write a data track, at least one of a top pole length and a bottom pole length trimmed to defining the data track width; and an untrimmed read element corresponding to each write element, each read element operative to read the data track;

wherein at least one of the top pole length and the bottom pole length for each write element is trimmed to remove excess pole material outside of a desired data track width centered across an azimuth line through the corresponding read element center and normal to the gap line.

12. A tape head for writing a plurality of data tracks onto magnetic tape, the tape head comprising a plurality of trimmed write elements and a plurality of untrimmed read elements, at least one read element corresponding to each write elements, wherein a length of at least one pole defining each write element is trimmed to be centered on an azimuth line extending between the write element and the at least one corresponding read element so as to align the write element with the at least one corresponding read element.

13. A thin film read-write-read tape head for writing a plurality of data tracks onto magnetic tape comprising:

a write module including a plurality of write elements, each write element having a top pole and a bottom pole operative to write a data track, the data track width defined by at least one of a top pole length and a bottom pole length; and two read modules, one read module on either side of the write module, each read module having a read element corresponding to each write element, each corresponding read element operative to read the data track;

wherein at least one of the top pole length and the bottom pole length is trimmed to remove excess pole material outside of a desired data track width centered across an azimuth line between corresponding read elements in each read module, the azimuth line determined prior to pole trimming.

14. A thin film read-write module for writing a plurality of data tracks on a magnetic tape comprising:

a plurality of write elements aligned along a gap line, each write element having a top pole and a bottom pole operative to write a data track, at least one of a top pole length and a bottom pole length defining the data track width; and a read element corresponding to each write element, each read element operative to read the data track;

wherein at least one of the top pole length and the bottom pole length for each write element is trimmed to remove excess pole material outside of a desired data track width centered across an azimuth line through the corresponding read element center and normal to the gap line, the azimuth line determined prior to pole trimming.

15. A tape head for writing a plurality of data tracks onto magnetic tape, the tape head comprising a plurality of write elements and a plurality of read elements, at least one read element corresponding to each write element, wherein a length of at least one pole defining each write element is trimmed to be centered on an azimuth line extending between the write element and the at least one corresponding read element so as to align the write element with the at least one corresponding read element, the azimuth line determined prior to pole trimming.

* * * * *